United States Patent
Miyajima et al.

(10) Patent No.: US 7,371,989 B2
(45) Date of Patent: May 13, 2008

(54) WIRE ELECTRIC DISCHARGE MACHINE

(75) Inventors: Keiichiro Miyajima, Yamanashi (JP); Yasuo Arakawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/524,400

(22) Filed: Sep. 21, 2006

(65) Prior Publication Data

US 2007/0068905 A1  Mar. 29, 2007

(30) Foreign Application Priority Data

Sep. 26, 2005 (JP) ............... 2005/277840

(51) Int. Cl.
*B23H 7/06* (2006.01)
*B23H 7/20* (2006.01)

(52) U.S. Cl. .................................... 219/69.12
(58) Field of Classification Search ............. 219/69.12, 219/69.16
See application file for complete search history.

(56) References Cited

U.S. PATENT DOCUMENTS

| | | | | |
|---|---|---|---|---|
| 4,703,146 | A * | 10/1987 | Kinoshita | 219/69.12 |
| 6,998,561 | B2 * | 2/2006 | Kato et al. | 219/69.12 |
| 7,301,116 | B2 * | 11/2007 | Chen et al. | 219/69.16 |
| 2004/0084419 | A1 * | 5/2004 | Kato et al. | 219/69.12 |

FOREIGN PATENT DOCUMENTS

| | | |
|---|---|---|
| EP | 0920944 A2 | 6/1999 |
| JP | 8-314518 A * | 11/1996 |
| JP | 2001-269819 A * | 10/2001 |

OTHER PUBLICATIONS

European Search Report issued Dec. 21, 2007 in corresponding European Patent Application No. 06254939.9-1262.

* cited by examiner

*Primary Examiner*—Geoffrey S. Evans
(74) *Attorney, Agent, or Firm*—Staas & Halsey LLP

(57) ABSTRACT

A wire electric discharge machine capable of taper machining with an improved accuracy. A reference wire correction amount d set in advance is determined to be a proper value for a wire-diameter correction amount for a speed control plane, and adjustment amounts for adjusting the reference wire correction amount for the upper and lower surfaces of a workpiece are determined to be proportional to $(1-Lu/Lm)$ and $(1-Ll/Lm)$, respectively, where $Lu$, $Lm$ and $Ll$ are machining distances at the upper surface, speed control plane and lower surface, respectively. As a proportionality coefficient, a reference adjustment amount e is set in advance. Using adjustment amounts $e(1-Lu/Lm)$ and $e(1-Ll/Lm)$, wire-diameter correction amounts for the workpiece upper and lower surfaces are determined to be $d+e(1-Lu/Lm)$ and $d+e(1-Ll/Lm)$. When a workpiece setting table and upper and lower wire guides are driven, axes are controlled so that a wire electrode follows, on the workpiece upper and lower surfaces, paths shifted by the wire-diameter amounts, respectively.

3 Claims, 15 Drawing Sheets

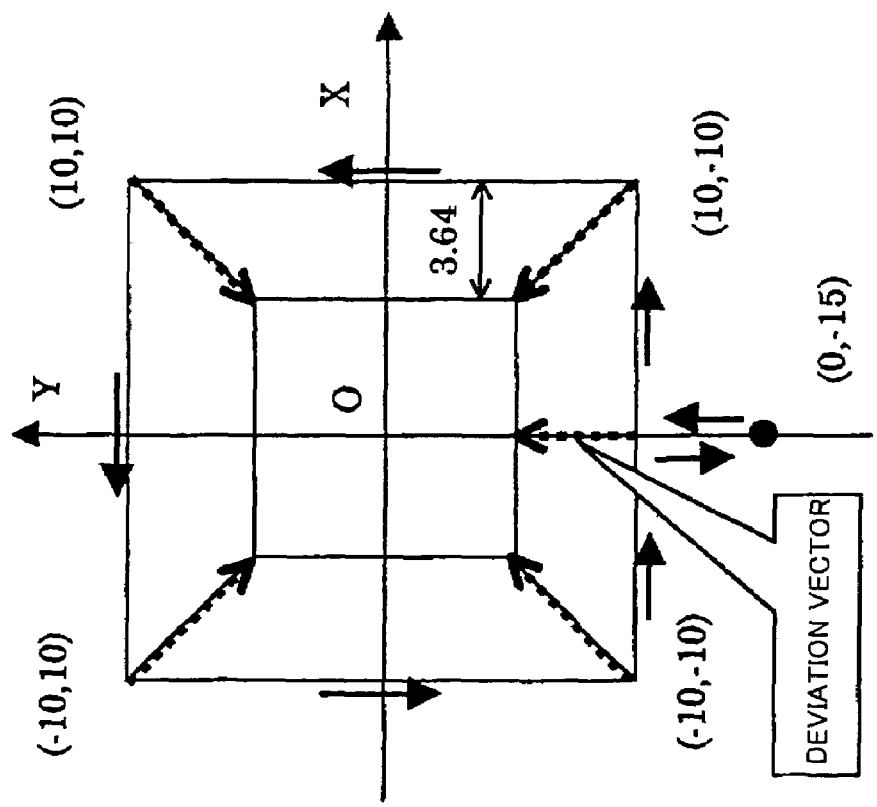

FIG.14

| TAPER ANGLE | WIRE-DIAMETER CORRECTION AMOUNT | REFERENCE ADJUSTMENT AMOUNT |
|---|---|---|
| 0 | d0 | e0 |
| 5 | d5 | e5 |
| 10 | d10 | e10 |
| 15 | d15 | e15 |
| 20 | d20 | e20 |

WIRE ELECTRIC DISCHARGE MACHINE

BACKGROUND OF THE INVENTION

1. Field of the Invention

The present invention relates to a wire electric discharge machine, and more specifically to a wire electric discharge machine having a taper machining function for machining a workpiece between a first plane and a second plane such that a machining shape on the first plane and a machining shape on the second plane are different.

2. Description of Related Art

Taper machining with a wire electric discharge machine is known. Normally, machining with a wire electric discharge machine is carried out with a workpiece set on an upward-facing workpiece setting surface. As a result of taper machining, the workpiece has non-congruent shapes at an upper surface and at a lower surface. FIG. 1 schematically shows such taper machining with cross-sectional planes parallel to the direction of an arrow. As understood from FIG. 1, regarding a movement in each block of a machining program, generally, the movement distance (machining distance) Lu at the upper surface of the workpiece and the movement distance (machining distance) L1 at the lower surface are different. This means that the relative speed between the wire electrode and the workpiece, or in other words, the machining speed is different on the workpiece upper surface and on the workpiece lower surface. In electric discharge machining, when the relative speed between the wire electrode and the workpiece is lower, the number of times that the electric discharge is produced is larger, so that a greater electric discharge gap is produced.

In this situation, control on the relative speed between the wire electrode and the workpiece is performed by setting an intermediate plane located midway between the upper and lower surfaces of the workpiece and parallel to the upper and lower surfaces, and controlling the relative speed between the wire electrode and the workpiece at this intermediate plane by commands fed according to the program. In this specification, this intermediate plane will be called "speed control plane". In taper machining, the machining distance Lm on the speed control plane is greater than the machining distance Lu at the upper surface and smaller than the machining distance L1 at the lower surface. Also the relative speed between the wire electrode and the workpiece on the speed control plane is a value intermediate between the value at the upper surface and the value at the lower surface.

The electric discharge gap itself exists no matter whether it is taper machining or not. Normally, the electric discharge gap is estimated as an amount to be added to a difference between the position of the wire and the position of the machining plane coming from the fact that the wire has a finite diameter. Generally, the correction to deal with the deviation comprised of both is called "wire-diameter correction". In other words, the "wire-diameter correction" intends to rectify a deviation of the "actual machining path" from the "machining path designated by the machining program", estimated as "wire diameter+electric discharge gap".

In the prior art, wire-diameter correction in taper machining was performed by setting a wire-diameter correction amount suited for the speed control plane and using it as a wire-diameter correction amount common to the workpiece upper and lower surfaces. However, for the reason described above, the actual electric discharge gap in taper machining is different on the workpiece upper surface and on the workpiece lower surface. Thus, as shown in FIG. 2 which is a cross-sectional view perpendicular to the direction of the arrow in FIG. 1, at the face where the machining speed is relatively low (in this instance, the upper surface), excessive machining (producing an over-cut) occurs, while at the face where the machining speed is relatively high (in this instance, the lower surface), deficient machining (leaving an uncut part) occurs. There is found no known publication describing a technique for easily solving such problem in taper machining.

SUMMARY OF THE INVENTION

The present invention provides a technique for easily solving the above problem in the taper machining. In other words, the present invention intends to improve a wire electric discharge machine having a taper machining function so that wire-diameter correction can be performed properly in the taper machining. Specifically, a wire electric discharge machine of the present invention has a taper machining function for machining a workpiece between a first plane and a second plane such that a machining shape on the first plane and a machining shape on the second plane are not congruent according to a machining program. The present invention improves accuracy of the taper machining by properly estimating a difference between electric discharge gaps at the first plane and the second plane in the taper machining, and adjusting the wire-diameter correction amount for the first plane and the second plane based on the estimated difference.

The wire electric discharge machine comprises: first means for obtaining a first machining path on the first plane and a second machining path on the second plane based on each of command blocks of the machining program; second means for calculating lengths of the first machining path and the second machining path; third means for adjusting a reference wire-diameter correction amount based on the lengths of the first and second machining paths to obtain adjusted wire-diameter correction amounts for the first and second machining paths, respectively; fourth means for correcting the first machining path and the second machining path according to the adjusted wire-diameter correction amounts to obtain corrected first and second machining paths; and fifth means for performing a taper machining by driving upper and lower wire guides relative to the workpiece according to the corrected first and second machining paths.

The third means may obtain the adjusted wire-diameter correction amount for the first machining path as a sum of the reference wire-diameter correction amount and a product of a reference adjustment amount and a first value obtained by a mathematical operation using the length of the first machining path and a length of a machining path on a speed control plane designated for speed control, and may obtain the adjusted wire-diameter correction amount for the second plane as a sum of the reference wire-diameter correction amount and a product of the reference adjustment amount and a second value obtained by a mathematical operation using the length of the second machining path and the length of the machining path on the speed control plane.

The first value may be obtained by dividing the length of the first machining path by the length of the machining path on the speed control plane and subtracting the resultant quotient from one, and the second value may be obtained by dividing the length of the second machining path by the length of the machining path on the speed control plane and subtracting the resultant quotient from one.

FIG. 3 schematically shows an example of mathematical operations performed in the electric discharge machine according to the present invention to determine the wire-diameter correction amounts for an upper surface of the workpiece as the first plane and a lower surface of the workpiece as the second plane.

First, a reference wire correction amount to be set in advance is determined as d. The reference wire correction amount d is a proper value for a wire-diameter correction amount for the speed control plane.

Then, the reference wire-diameter correction amount d is adjusted for the upper and lower surfaces of the workpiece. An adjustment amount for the upper surface is determined to be proportional to $(1-Lu/Lm)$ and an adjustment amount for the lower surface is determined to be proportional to $(1-Ll/Lm)$.

Here, Lu, Lm and Ll are a machining distance at the upper surface, a machining distance on the speed control plane and a machining distance at the lower surface, respectively. Since, as a proportionality coefficient, a reference adjustment amount e is set in advance, the adjustment amounts are $e(1-Lu/Lm)$ and $e(1-Lu/Lm)$. Accordingly, the wire-diameter correction amount for the upper surface of the workpiece is $d+e(1-Lu/Lm)$, while the wire-diameter correction amount for the lower surface of the workpiece is $d+e(1-Ll/Lm)$. It is desirable that for the reference adjustment amount e, a proper value be determined, allowing for the design (for example, by performing experiments for different types of workpiece and different sets of machining conditions, respectively), so that the "actual taper surface" will agree with the "programmed taper surface" to the highest possible degree.

In the wire electric discharge machine according to the present invention, proper wire-diameter correction can be performed for the upper and lower surfaces of a workpiece in taper machining, so that the accuracy of taper machining improves.

BRIEF DESCRIPTION OF THE DRAWINGS

FIG. 8b shows command contents corresponding to the machining shape shown in FIG. 8a, FIG. 9 is a diagram for explaining how a shape on the workpiece upper surface can be obtained by performing addition and subtraction of deviation vectors on a shape on the workpiece lower surface, FIG. 14 is a diagram exemplifying a table storing proper values for d and e in the manner associated with taper angles.

DETAILED DESCRIPTION

Figure 1:
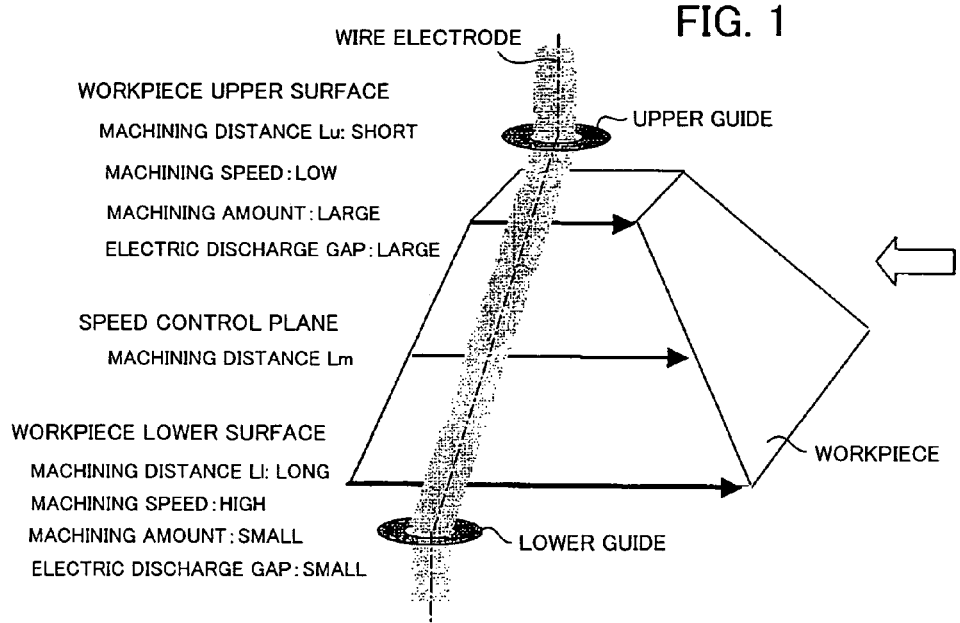
FIG. 1 is a diagram schematically showing, at a cross-setional plane parallel to the direction of an arrow, how the movement distance (machining distance), machining speed and electric discharge gap differ at the upper surface and at the lower surface of a workpiece in taper machining.
Figure 2:
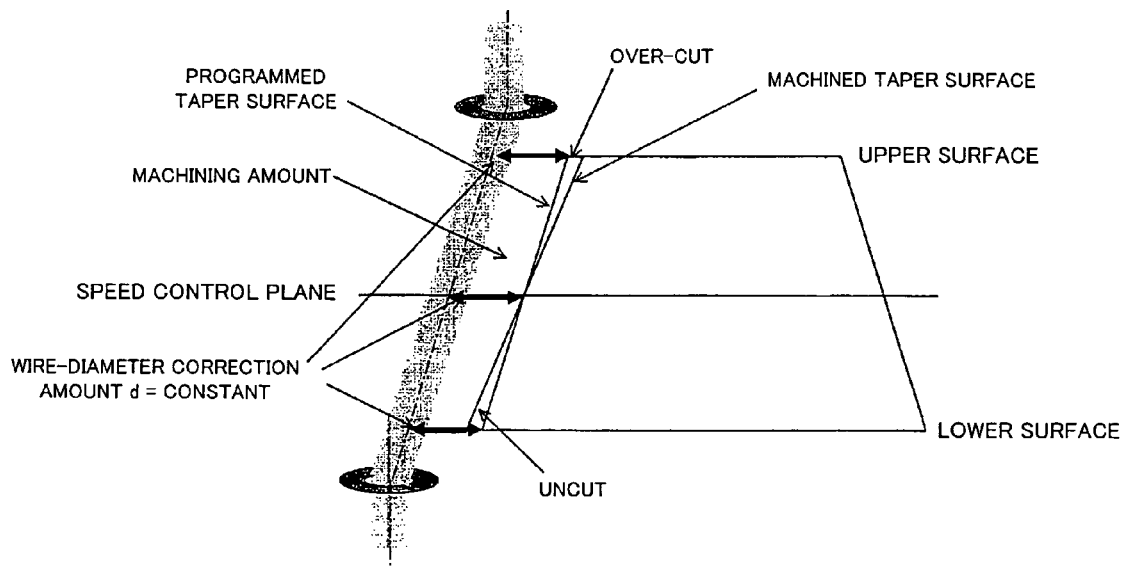
FIG. 2 is a diagram for explaining a problem with the prior art in taper machining.
Figure 3:
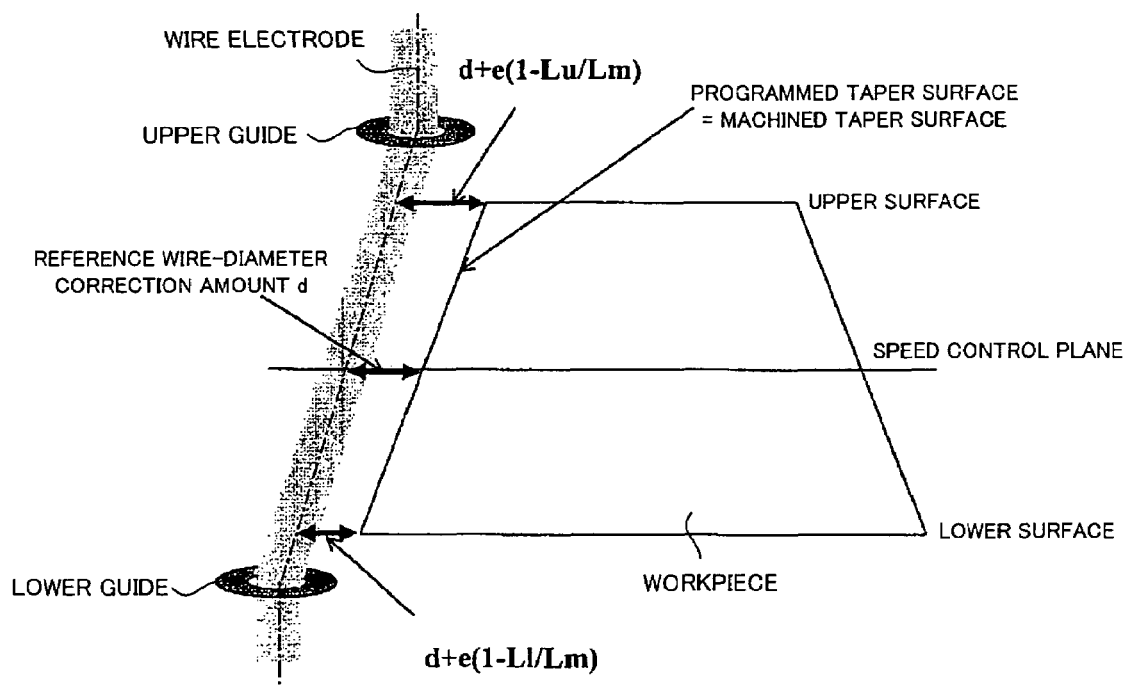
FIG. 3 is a diagram schematically showing an example of mathematical operations performed in an electric discharge machine according to the invention to determine wire-diameter correction amounts for the upper and lower surfaces of a workpiece.
Figure 4:
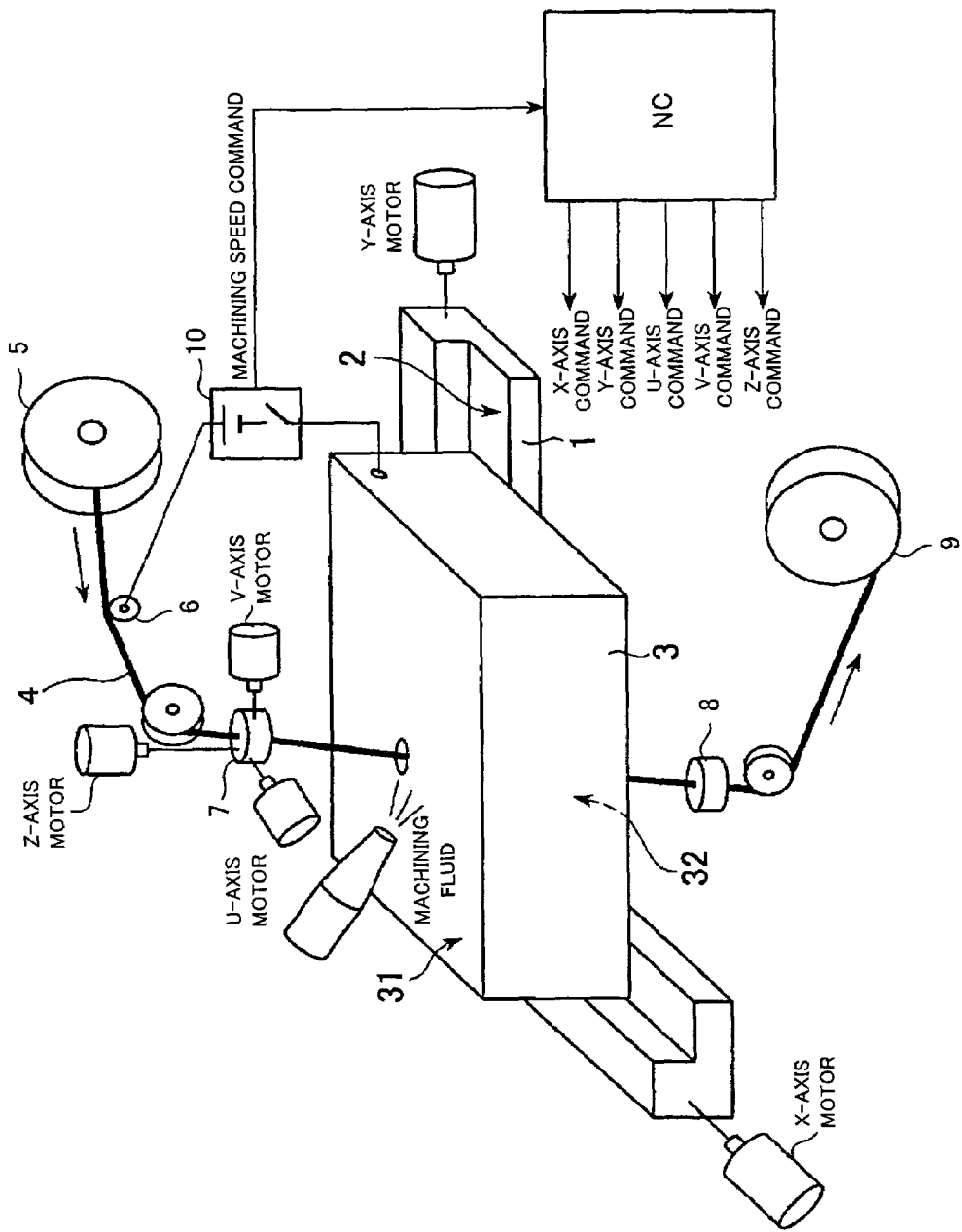
FIG. 4 is a diagram for explaining the schematic structure and operation of a wire electric discharge machine to which the present invention is applicable.

First, referring to FIG. 4, the schematic structure and operation of a wire electric discharge machine to which the present invention is applicable will be described. The basic structure of the wire electric discharge machine shown is the same as the conventional one. Specifically, reference sign 1 denotes a workpiece setting table for setting and fixing a workpiece 3 to be machined, which has an upward-facing setting surface 2 flat to a high accuracy. In machining, the workpiece 3 is set and fixed on the workpiece setting table with its bottom face in contact with the setting surface 2.

In the workpiece 3, the entire top face (upper surface) 31 is parallel to the bottom face (lower surface) 32. Here, a workpiece 3 in the shape of a cuboid is exemplified, so that the entire top face 31 is parallel to the bottom face 32. The workpiece 3 can however be such that only part of the top face is parallel to the bottom face. Reference sign 4 denotes a wire electrode fed from a wire-electrode feed reel 5 via a power supply roller 6, an upper wire guide 7, etc. for performing electric discharge machining on the workpiece 3. In machining, the wire electrode is stretched between the upper and lower guides by wire connection operation, and a voltage is applied from an electric discharge power source 10 to produce electric discharge between the wire electrode and the workpiece 3.

The wire electrode 4 is further pulled by a specified pulling force and wound onto a collection reel via a lower guide 8, a guide roller, etc. The wire electrode may be collected into a wire collection box instead of being wound onto a collection reel.

Although not described in detail, a technique such as pouring machining fluid onto a machining location or immersing the whole workpiece 3 in a machining fluid (pure water, for example) is adopted.

Normally, the setting surface 2 of the workpiece setting table 1 extends horizontally (on a plane parallel to the XY plane), and the workpiece setting table 1 can be driven by servo motors for the X and Y axes to move on a plane parallel to the XY plane. The upper wire guide can be driven by servo motors for the U and V axes to move on a plane parallel to the XY plane and driven by a servo motor for the Z axis to move perpendicular to the XY plane. Normally, the direction of movement by the U axis and the direction of movement by the X axis are parallel, while the direction of movement by the V axis and the direction of movement by the Y axis are parallel.

The machining location can be changed by changing the relative position between the workpiece 3 and the wire electrode 4. The direction of the machining cross-sectional plane can be changed by changing the direction in which the wire electrode 4 is stretched. These changes can be achieved by combining the movements of the X, Y, U, V and Z axes appropriately. The movements of these axes are effected by commands for the axes (X axis command, Y axis command, U axis command, V axis command, Z axis command) fed from a numerical controller. Normally, the contents of the commands are defined according to a machining program (hereinafter referred to also simply as "program").

As understood from the above-described axis structure, there are cases in which not the wire electrode guides but the workpiece setting table is actually drive-controlled. Here, however, first, taper machining will be described assuming that the upper and lower wire guides are drive-controlled.

As known, in taper machining, the upper and lower wire guides are arranged at horizontally different positions to stretch the wire electrode 4 at an angle to the Z axis direction. In taper machining, the horizontal cross-sectional shape of the workpiece differs depending on the height. In this specification, non-congruent shapes will be called "different shapes". In other words, the shapes which are similar but different in size will be called "different shapes".

In connection with the horizontal cross-sectional shapes different at different heights, a horizontal plane intended to produce a cross-sectional shape identical to the shape designated by the machining program will be called a program plane, and another horizontal cross-sectional plane apart from the program plane by a distance corresponding to the thickness of the workpiece will be called an auxiliary plane. A taper machining plane where the wire electrode operates on the workpiece is defined between the program plane and the auxiliary plane. The height of the program plane is given by J relative to the workpiece setting table on which the workpiece is set. The distance (with a plus or minus sign) from the height of the program plane to the auxiliary plane is given by I.

I and J may be directly fed according to the machining program, or entered through an MDI (external input device) prior to machining. Regarding the plus and minus signs, the upward direction (+Z direction) is considered plus. By feeding zero as I, it is possible to set the program and auxiliary planes at the lower and upper surfaces, respectively. By feeding a negative value as I, it is possible to set the program and auxiliary planes at the upper and lower surfaces, respectively.

Figure 5:
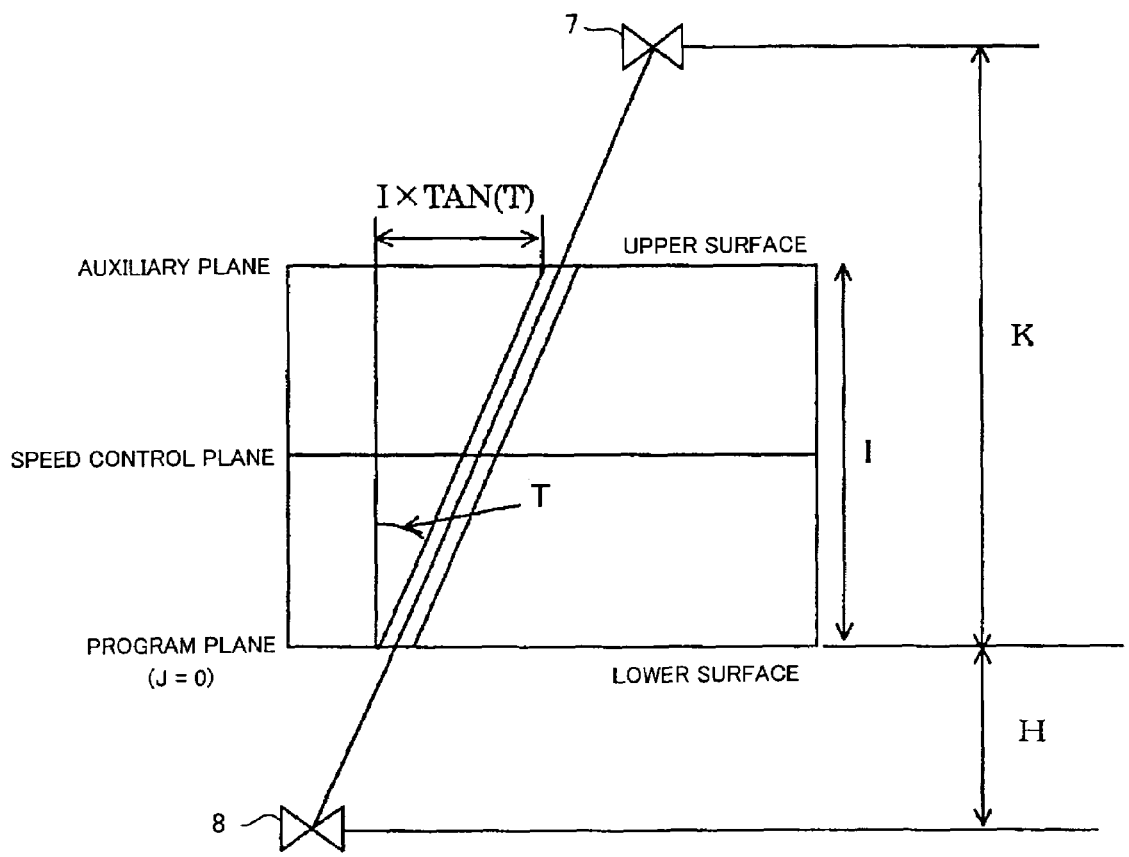
FIG. 5 is a vertical cross-sectional view showing an example in which a command J giving the height of a program plane is J=0.
Figure 6:
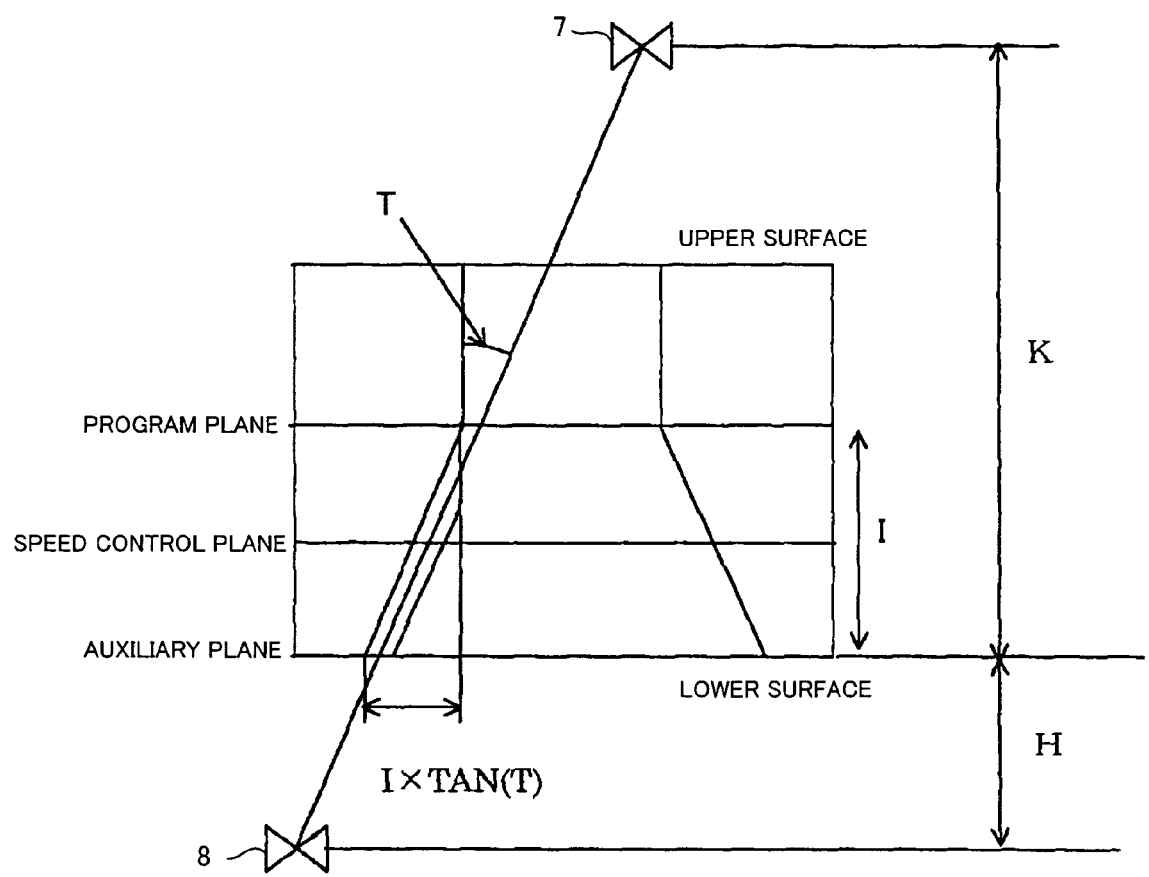
FIG. 6 is a vertical cross-sectional view showing an example in which a command J giving the height of a program plane is J>0.

FIG. 5 shows, in a vertical cross section, an example in which J=0, where the program and auxiliary planes are set at the lower and upper surfaces, respectively. Meanwhile, FIG. 6 shows, in a vertical cross section, an example in which I<0 and J>0, where the program plane is located between the workpiece upper and lower surfaces and the auxiliary plane is set at the lower surface. In FIGS. 5 and 6, H, K and T represent the following amounts:

H; distance. from the workpiece lower surface to the lower guide

K; distance from the workpiece lower surface to the upper guide

T; taper angle (angle between the direction in which the wire electrode is stretched and the Z axis direction)

In FIGS. 5 and 6, the deviation (offset) of the wire electrode position on the auxiliary plane (workpiece upper surface) from the wire electrode position on the program plane is I×TAN(T).

In the case of flank machining for dies, etc., the program plane is set at a certain height of the workpiece as shown in FIG. 6. Like this, generally, there are cases in which the workpiece upper and lower surfaces do not serve directly as the program and auxiliary planes. Here, however, for ease of explanation, explanation will be given with the program and auxiliary planes fixed at the workpiece lower and upper surfaces, respectively, as shown in FIG. 5.

In wire electric discharge machining, an electric-discharge-machining power source determines the machining speed on the basis of the state of electric discharge, where since the machining speed is different on the workpiece upper surface and on the workpiece lower surface (as explained later in detail), it is necessary to specify a horizontal plane at which the machining speed is controlled to be a designated speed (speed control plane). There are cases in which machining is performed by designating the height of the speed control plane directly. Here, however, explanation will be given assuming thon the speed control plane is an intermediate plane between the program and auxiliary planes at which the machining speed is a mean.

Figures 7A, 7B:
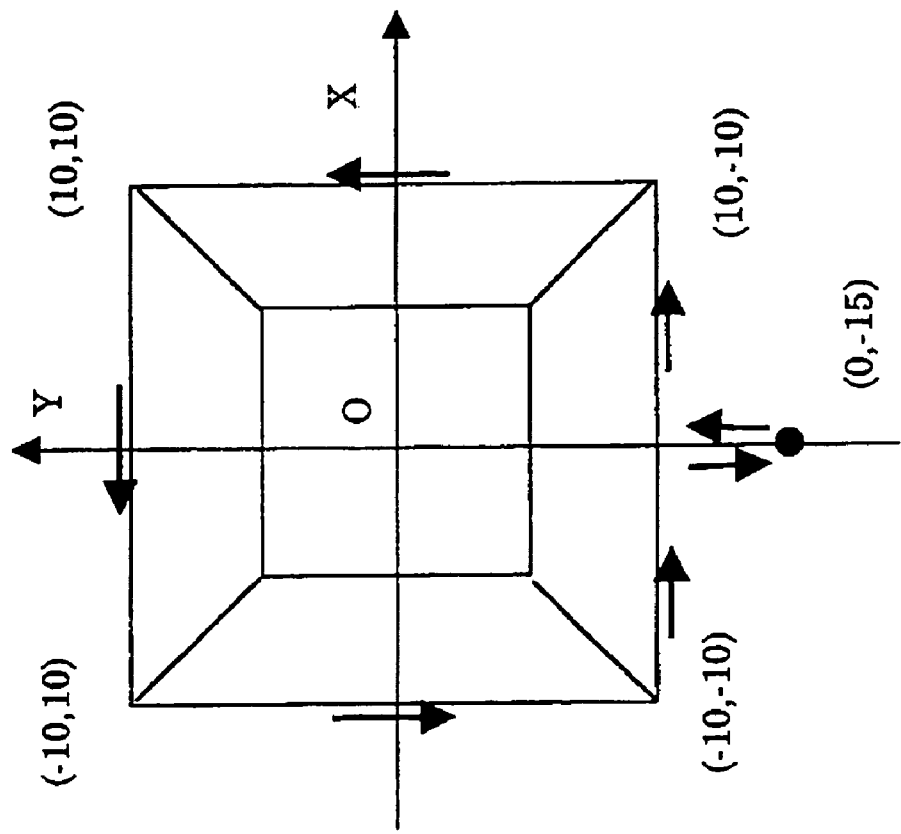
FIG. 7a is a top view (viewed from the +Z direction) showing an example of a machining shape obtained by a first programming method.
FIG. 7b shows command contents corresponding to the machining shape shown in FIG. 7a, FIG. 8a is a top view (viewed from the +Z direction) showing an example of a machining shape obtained by a second programming method.

The programming methods used in taper machining can be classified broadly into two. A first programming method is a method in which the shape of the workpiece lower surface, the direction of inclination of the taper surface, and the taper angle are designated. On the basis of the designated direction of inclination and taper angle, the machining shape on the workpiece upper surface is calculated, and the upper and lower wire guides are drive-controlled. Generally, similar machining shapes are obtained on the workpiece upper surface and on the workpiece lower surface. As the direction of inclination of the taper surface, the right inclination (represented by code G51) or the left inclination (represented by code G52) relative to the direction of progress of machining can be designated. FIG. 7a shows, in a top plan (viewed from the +Z direction), an example of a machining shape obtained by this programming method. FIG. 7b exemplifies the command contents corresponding to the machining shape shown in FIG. 7a.

A second programming method is also called a different-upper-and-lower-shapes machining program. It is a method in which the shape of the workpiece upper surface as well as the shape of the workpiece lower surface is designated directly. Generally, for each command block, deviation vectors relating to the workpiece upper and lower surfaces are defined, which makes the program complicated but makes it possible to define a taper surface that cannot be represented simply by an inclination angle. Thus, this method is used in special taper machining. FIG. 8a shows, in a top plan (viewed from the +Z direction), an example of a machining shape obtained by this programming method. FIG. 8b exemplifies the command contents corresponding to the machining shape shown in FIG. 8a. Arrows in broken line in FIG. 8a are deviation vectors relating to the workpiece upper and lower surfaces.

Here, let us consider the wire-diameter correction (correction for rectifying a machining shape error due to the wire diameter and the electric discharge gap). As already mentioned, in taper machining, the proper wire-diameter correction amount on the workpiece upper surface is not the same as that on the workpiece lower surface. In order to obtain the respective proper correction amounts, first, the shape on the workpiece upper surface needs to be calculated. In the different-upper-and-lower-shapes machining program (second programming method), deviation vectors are directly defined in each block. Thus, by performing addition and subtraction of deviation vectors on the shape on the workpiece lower surface, the shape on the workpiece upper surface can be easily obtained.

Figure 9:
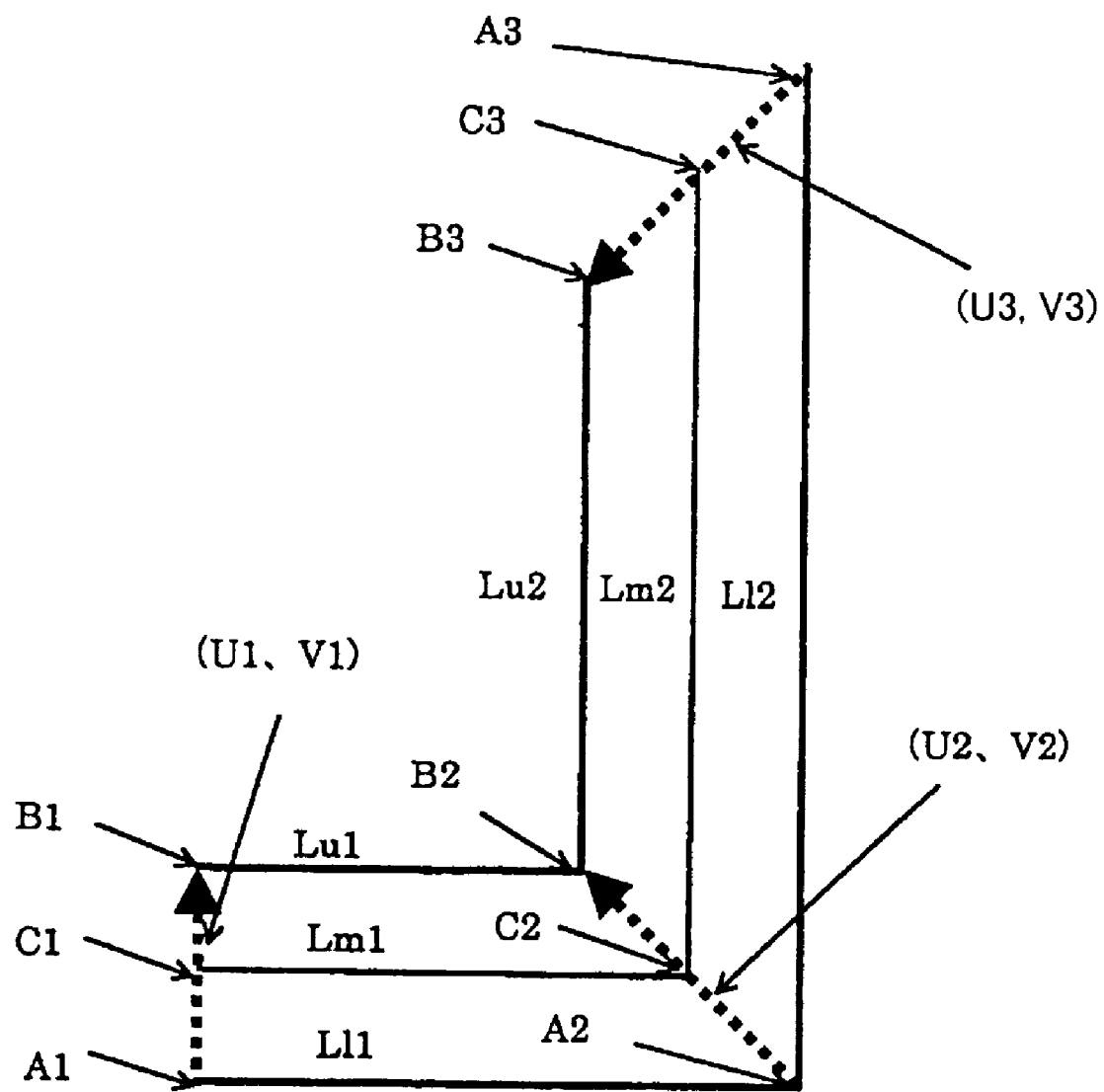

FIG. 9 is a diagram for explaining this addition and subtraction, where signs A1, A2, A3 exemplify three points representing a machining shape on the workpiece lower surface, and B1, B2, B3 exemplify three points corresponding to the above three points and representing a machining shape on the workpiece upper surface, where A2 and B2 are corner points. In this case, for example the (shape B2, B3) on the workpiece upper surface is expressed by the expression:

(shape $B2, B3$)=(shape $A2, A3$)+($U3, V3$)−($U2, V2$)

Here, ($U2, V2$) is a deviation vector given for points A2, B2, and ($U3, V3$) is a deviation vector given for points A3, B3.

Meanwhile, when the taper angle is designated in the first programming method, the shape on the workpiece upper surface needs to be calculated on the basis of the shape on the workpiece lower surface, direction of inclination, and taper angle defined in the program.

Figure 10:
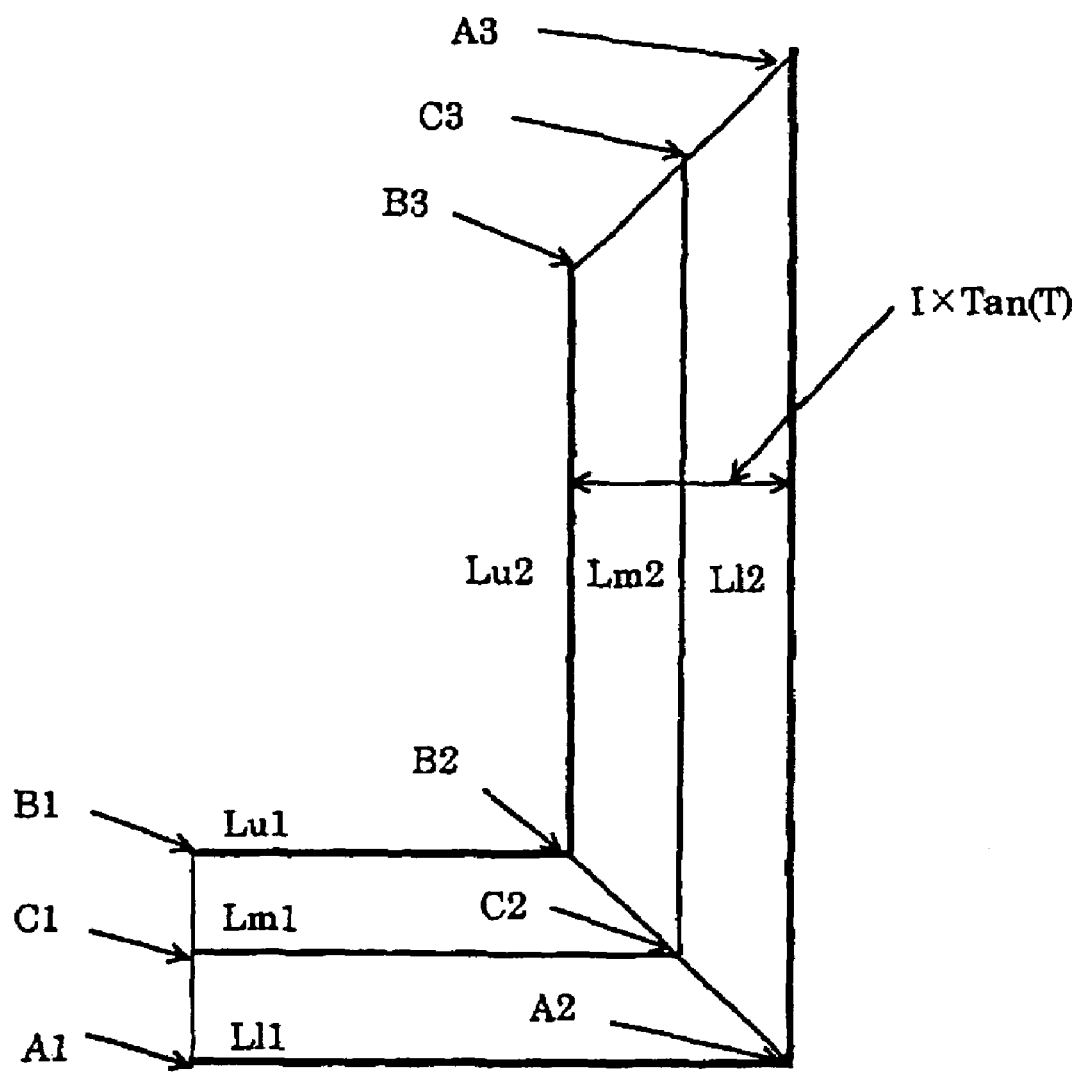
FIG. 10 is a diagram for explaining how a shape on the workpiece upper surface can be obtained based on the shape on the workpiece lower surface, direction of inclination, and taper angle defined in the program.

FIG. 10 is a diagram for explaining this calculation. In the same way as in FIG. 9, signs A1, A2, A3 exemplify three points representing a machining shape on the workpiece lower surface, and B1, B2, B3 exemplify three points corresponding to the above three points and representing a machining shape on the workpiece upper surface, where A2 and B2 are corner points. In this case, the shape B1, B2, B3, . . . on the workpiece upper surface results from offsetting the shape A1, A2, A3, . . . on the workpiece lower surface by an amount I×TAN(T) to the left relative to the direction of machining progress (G52 represents the left inclination relative to the direction of machining progress), and can be easily obtained by a known offset calculation.

In either of the above cases, the shape C1, C2, C3, . . . on the speed control plane (see FIGS. 9 and 10) is obtained as a set of points midway between the workpiece lower surface and the workpiece upper surface. Needless to say, when the height of the speed control plane is designated, the shape on the speed control plane can be obtained through proportional distribution. Thus, the machining distance L1 on the workpiece lower surface, the machining distance Lu on the workpiece upper surface, and the machining distance Lm on the speed control plane in each block of the machining program can be obtained easily.

Figure 11:
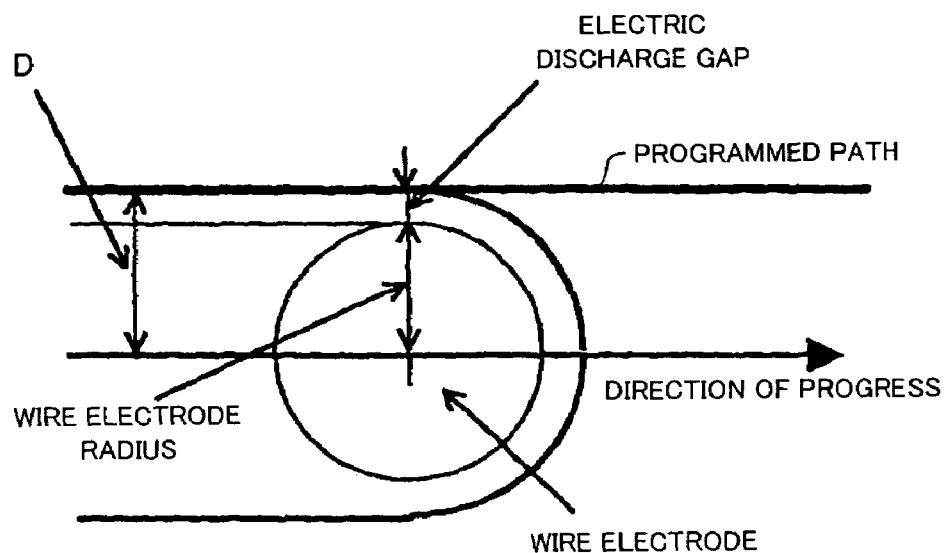
FIG. 11 is a diagram for explaining a way of obtaining a wire-diameter correction amount D in taper machining.
Figure 12:
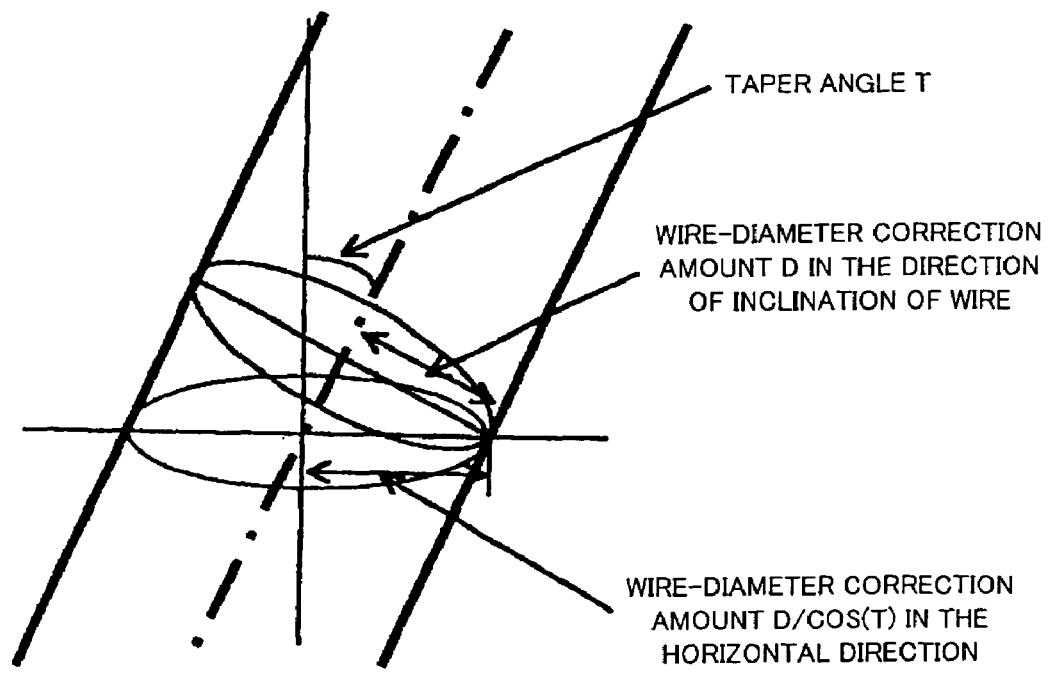
FIG. 12 is a diagram for explaining another way of obtaining a wire-diameter correction amount D in taper machining.

In actual machining, the shape A1, A2, A3, . . . on the workpiece lower surface and the shape B1, B2, B3, . . . on the workpiece upper surface can be produced by offsetting the machining path by the wire-diameter correction amount, i.e., the sum of the wire radius and the electric discharge gap amount, to the right relative to the direction of machining progress (G42 is a code representing an offset to the right relative to the direction of machining progress) and carrying out electric discharge machining by moving the wire electrode along the machining path thus offset. As a method of determining the wire-diameter correction amount, there is a method in which the workpiece machined into a taper shape is actually measured to obtain a value corresponding to the electric discharge gap amount+wire diameter (wire electrode radius) as the wire-diameter correction amount D, as shown in FIG. 11. There is also another method in which the wire-diameter correction amount in vertical machining divided by the cosine for the taper angle is used as a wire-diameter correction amount D in taper machining, as shown in FIG. 12.

In the prior art, however, the same wire-diameter correction amount was used for the workpiece upper surface and the workpiece lower surface, which was a cause of decrease in accuracy of taper machining. In the present invention, the taper machining accuracy in actual taper machining is increased by using different wire-diameter correction amounts for the workpiece upper surface and the workpiece lower surface. Here, what needs to be taken into consideration is that the interpolation for a movement path in each block of the machining program needs to be started on the workpiece upper surface and the workpiece lower surface at the same time and finished at both faces at the same time.

This logically requires different machining speeds on the workpiece upper surface and the workpiece lower surface. Generally, the machining speed is fed from the machining power source on the basis of the actual state of electric discharge machining. Here, when this machining speed is represented by Fm, the machining speed Fl on the workpiece lower surface and the machining speed Fu on the workpiece upper surface need to be as follows:

$Fl=Fm\times(Ll/Lm)$ $Fu=Fm\times(Lu/Lm)$

As already mentioned, this difference in speed produces a difference in electric discharge gap amount.

Specifically, the electric discharge gap amount differs on the workpiece lower surface and on the workpiece upper surface, so that an uncut part remains at the plane where the speed is high and an over-cut is produced at the plane where the speed is low, so that the designated taper-angle face cannot be obtained. It can be thought that the amount of change in electric discharge gap is almost proportional to the frequency of electric discharge, and that the frequency of electric discharge is almost inversely proportional to the machining speed. Accordingly, by using, for the workpiece upper surface and workpiece lower surface, the wire-diameter correction amount decreased in proportion to the difference between the machining speed on the speed control plane and the machining speed at the workpiece upper or lower surface, the taper angle error due to the change in electric discharge gap can be corrected.

Figure 13:
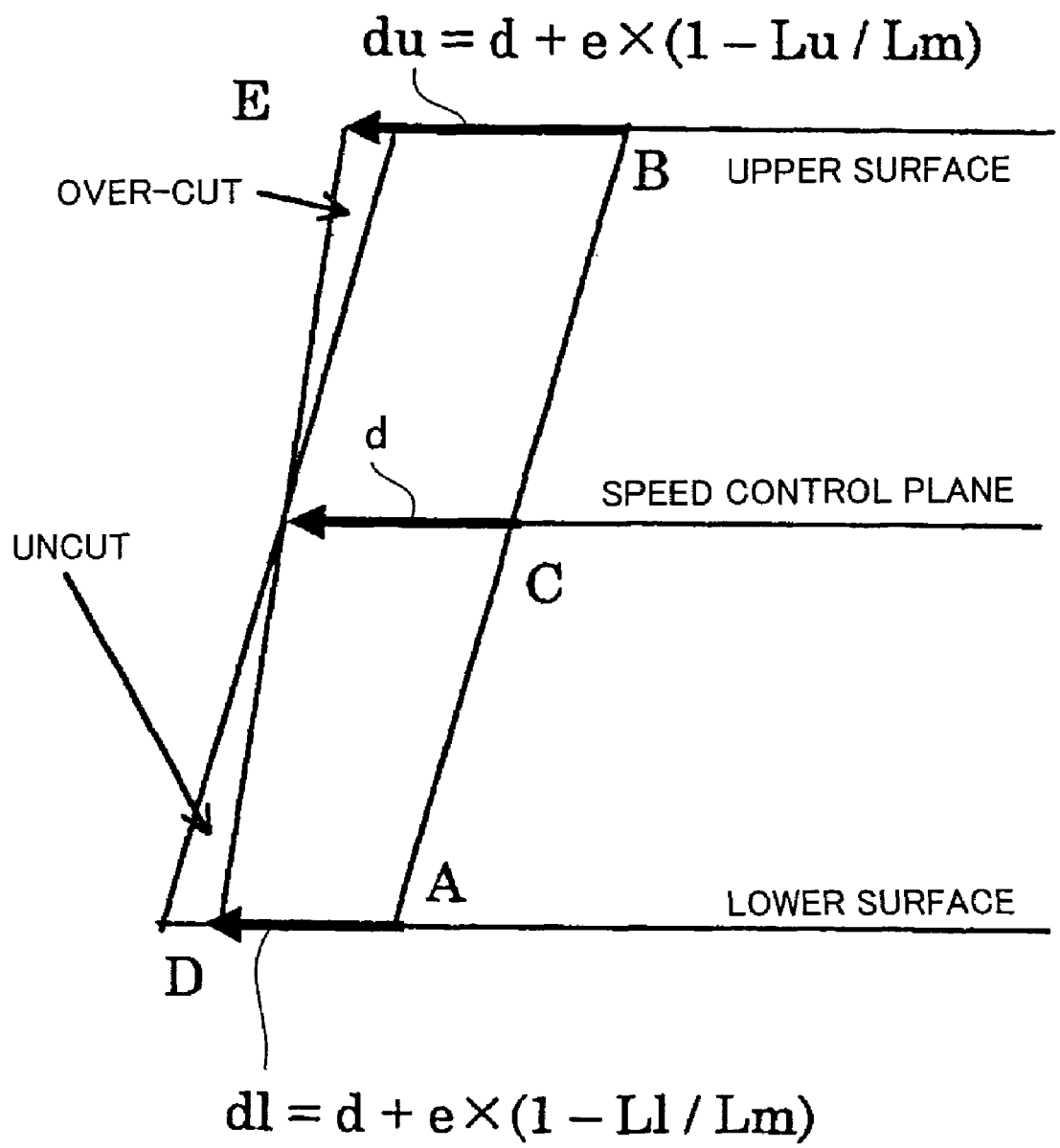
FIG. 13 is a diagram for explaining how to calculate proper values for the wire-diameter correction amount for the workpiece upper and lower surfaces.

As shown in FIG. 13, when the wire-diameter correction amount on the speed control plane is represented by d and a reference adjustment amount for adjusting the wire-diameter correction amount (multiplier by which the amount of change in electric discharge gap related to the difference in machining speed is multiplied) is represented by e, a proper value for the wire-diameter correction amount dl for the workpiece lower surface and a proper value for the wire-diameter correction amount du for the workpiece upper surface are $dl=d-e\times(Fl-Fm)/Fm=d+e\times(1-Ll/Lm)$ $du=d-e\times(Fu-Fm)/Fm=d+e\times(1-Lu/Lm)$ The expressions show that the wire-diameter correction amount can be changed on the basis of the machining distance (Lu at the upper surface and Ll at the lower surface) in each block. Proper values for d and e can be obtained by an experiment such as a machining test.

The proper values for d and e vary depending on the taper angle. Thus, for example, as shown in FIG. 14, it can be arranged such that a table storing values for d and e corresponding to taper angles consecutive with an appropriate interval is prepared in advance so that d and e values corresponding to an interpolated specified taper angle are obtained on the basis of the table. Alternatively, it can be arranged such that only d and e values for the wire electrode in vertical position are stored so that the d and e values divided by the cosine for a taper angle are used in taper machining.

To sum up, for each block of the machining program, wire-diameter correction amounts for the workpiece upper surface and the workpiece lower surface are calculated, respectively. Then, as shown in FIG. 15, a shape D1, D2, D3, . . . resulting from offsetting the shape A1, A2, A3, . . . on the workpiece lower surface to the right relative to the direction of machining progress (G42 represents the right relative to the direction of machining progress) by the wire-diameter correction amount d1 (which differs depending on the block), and a shape E1, E2, E3, . . . resulting from offsetting the shape B1, B2, B3, . . . on the workpiece upper surface to the right relative to the direction of machining progress by the wire-diameter correction amount du (which differs depending on the block) are obtained.

Figure 15:
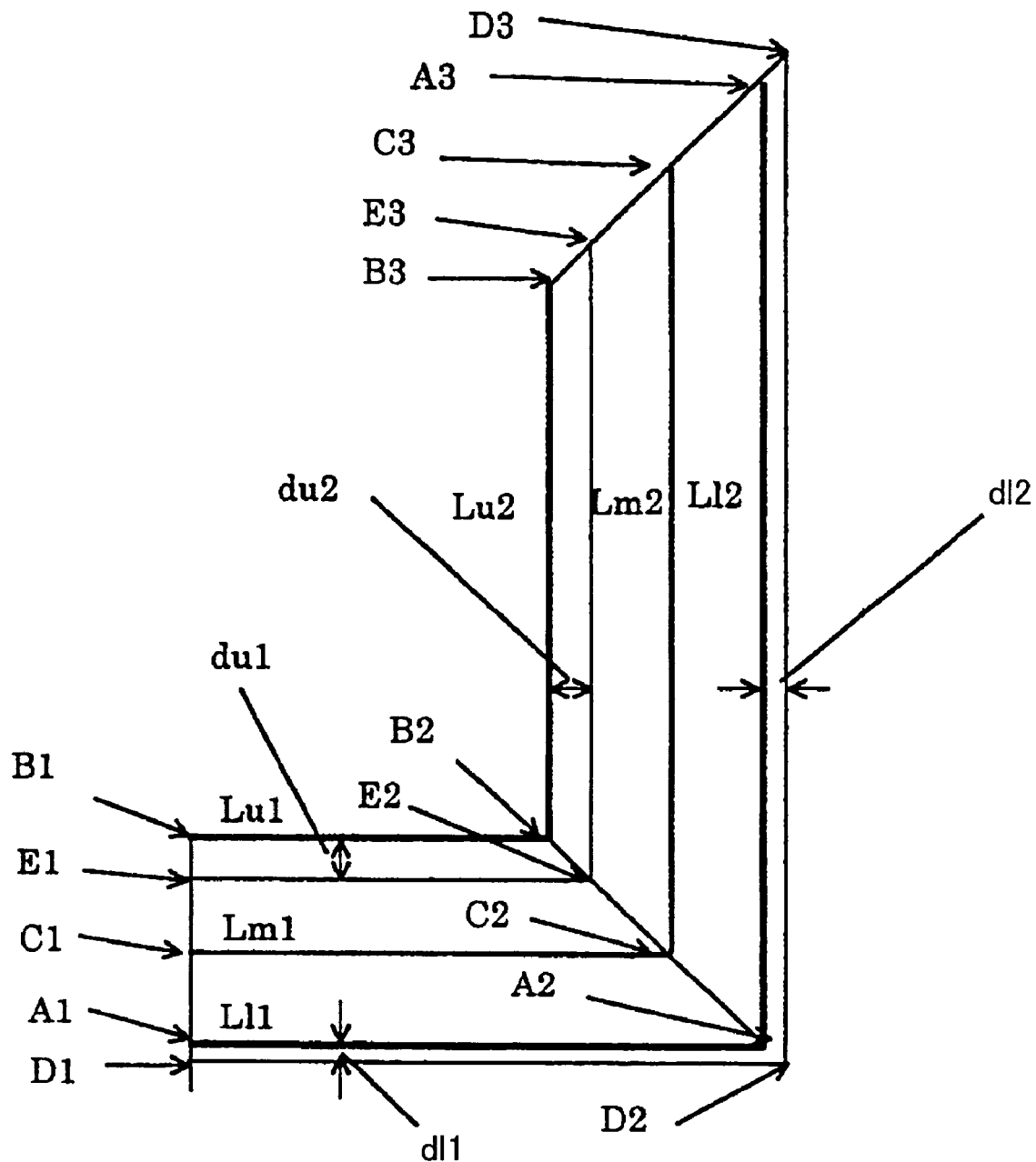
FIG. 15 is a diagram for explaining how to obtain wire paths on the workpiece upper and lower surfaces resulting from proper wire-diameter correction.

The signs in FIG. 15 represent the following amounts:

Lu1; movement distance at the upper surface in the block corresponding to the section A1-A2

Lm1; movement distance on the speed control plane in the block corresponding to the section A1-A2

Ll1; movement distance at the lower surface in the block corresponding to the section A1-A2 du1; wire-diameter correction amount for the upper surface in the block corresponding to the section A1-A2 dl1; wire-diameter correction amount for the lower surface in the block corresponding to the section A1-A2 du2; wire-diameter correction amount for the upper surface in the block corresponding to the section A2-A3 dl2; wire-diameter correction amount for the lower surface in the block corresponding to the section A2-A3

By drive-controlling the upper and lower wire guides so that the wire electrode moves along the paths thus obtained, decrease in accuracy of the taper angle due to the difference in machining distance between the workpiece upper surface and the workpiece lower surface is compensated for, so that taper machining can be performed accurately as defined by the machining program.

The movement paths calculated this way are those on the workpiece upper and lower surfaces. The actual movement of the wire electrode according to these movement paths is intended to be achieved through drive control on servo motors which drive the upper and lower wire guides. Thus, interpolation is required for the upper and lower wire guides so that the wire electrode moves, passing through D1, D2, D3, . . . on the workpiece lower surface and passing through E1, E2, E3, . . . on the workpiece upper surface. The interpolation calculation is performed in each interpolation cycle of a fixed period.

First, in order to keep the electric discharge gap amount on the speed control plane optimal, machining speeds Fm are fed from the electric-discharge-machining power source, successively. The machining speeds are values with a sign. If a negative value is fed, so-called backward movement control is performed to cause a backward movement on the machining path to widen the electric discharge gap or remove a short circuit between the workpiece and the wire electrode. The details of the backward movement control will be omitted here. When a machining speed Fm is fed from the machining power source, machining speeds on the workpiece upper and lower surfaces are as follows:

$$Fl = Fm \times (Ll/Lm)$$

$$Fu = Fm \times (Lu/Lm)$$

Here, Ll, Lu, Lm (each differs depending on the block) represent distances according to the machining paths resulting from wire-diameter correction, which are more or less different from the machining distances before the wire-diameter correction, used in calculating wire-diameter correction amounts. Properly, also the wire-diameter correction amounts should be calculated on the basis of the machining distances resulting from the wire-diameter correction. However, the machining distances resulting from the wire-diameter correction are unknown at the stage of calculating the wire-diameter correction amounts, and therefore, the wire-diameter correction amounts are calculated on the basis of the machining distances before the wire-diameter correction. It is, however, to be noted that the actual wire-diameter correction amount is a minute value of 0.5 mm or smaller so that an error can be disregarded.

A motion amount $\Delta l$ on the workpiece lower surface and a motion amount $\Delta u$ on the workpiece upper surface in an interpolation cycle (period P) are each obtained by multiplying a machining speed by the interpolation period:

$$\Delta l = Fl \times P$$

$$\Delta u = Fu \times P$$

Figure 16:
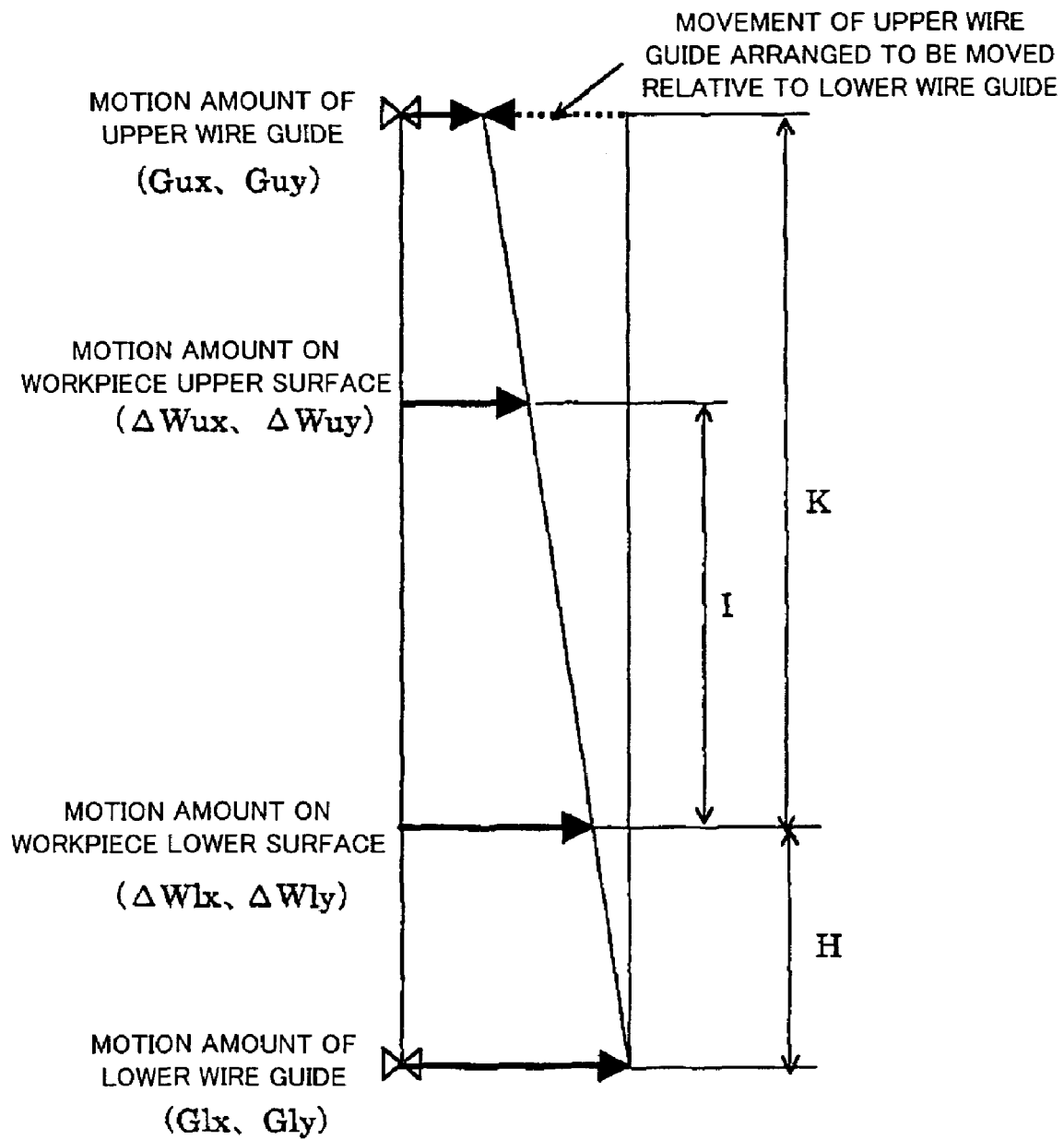
FIG. 16 is a diagram for explaining how to obtain wire paths on the workpiece upper and lower surfaces resulting from proper wire-diameter correction.

By resolving the movement amounts on the workpiece upper and lower surfaces into directional components of the machining path, movement amounts in the X and Y axis directions on the workpiece upper and lower surfaces can be obtained. For example, as shown in FIG. 16, when the machining path on the workpiece lower surface is (Wlx, Wly) and the machining path on the workpiece upper surface is (Wux, Wuy), the motion amount $\Delta$Wlx in the X axis direction and the motion amount $\Delta$Wly in the Y axis direction on the workpiece lower surface and the motion amount $\Delta$Wux in the X axis direction and the motion amount $\Delta$Wuy in the Y axis direction on the workpiece upper surface are expressed by the following equations:

$$\Delta Wlx = \Delta l \times Wlx/SQRT((Wlx)^{}2 + (Wly)^{}2)$$

$$\Delta Wly = \Delta l \times Wly/SQRT((Wlx)^{}2 + (Wly)^{}2)$$

$$\Delta Wux = \Delta u \times Wux/SQRT((Wux)^{}2 + (Wuy)^{}2)$$

$$\Delta Wuy = \Delta u \times Wuy/SQRT((Wux)^{}2 + (Wuy)^{}2)$$

(Here, SQRT represents square root and **2 represents square.)

In order to actually move the upper and lower wire guides, it is necessary to convert these movement quantites into movement amounts (Glx, Glx) for the lower wire guide and movement amounts (Gux, Gux) for the upper wire guide, on the basis of vertical positional relationship between the upper and lower wire guides and the workpiece.

$$Glx = \Delta Wlx + (\Delta Wlx - \Delta Wux) \times (H/I)$$

$$Gly = \Delta Wly + (\Delta Wly - \Delta Wuy) \times (H/I)$$

$$Gux = \Delta Wux + (\Delta Wux - \Delta Wlx) \times (K-I)/I$$

$$Guy = \Delta Wuy + (\Delta Wuy - \Delta Wly) \times (K-I)/I$$

When these movement amounts for the lower wire guide are fed to the servo motors for the X and Y axes and the movement amounts for the upper wire guide are fed to the servo motors for the U and Y axes, the wire electrode speed on the speed control plane agrees with the machining speed Fm fed as a command from the electric-discharge-machining power source and taper machining can be performed with an accurate taper angle.

In an arrangement in which the upper wire guide is moved relative to the lower wire guide as shown in the schematic diagram of the wire electric discharge machine, the control can be performed by feeding differences between the movement amounts for the upper wire guide and the movement amounts for the lower wire guide, expressed by the equations below, to the servo motors for the U and V axes, respectively.

$$Gux-Glx=(\Delta Wux-\Delta Wlx)\times(H+K)/I$$

$$Guy-Gly=(\Delta Wuy-\Delta Wly)\times(H+K)/I$$

As described above, when for each block of the machining program, diameter correction amounts for the workpiece upper and lower surfaces are calculated, and a shape D1, D2, D3, . . . resulting from offsetting the shape A1, A2, A3, . . . on the workpiece lower surface to the right relative to the direction of machining progress (G42 represents the right relative to the direction of machining progress) by the wire-diameter correction amount dl (which differs depending on the block) and a shape E1, E2, E3, . . . resulting from offsetting the shape B1, B2, B3, . . . on the workpiece upper surface to the right relative to the direction of machining progress by the wire-diameter correction amount du (which differs depending on the block) are obtained, commands specifying the path D1, D2, D3, . . . and the path E1, E2, E3, . . . can be generated.

Figure 17:
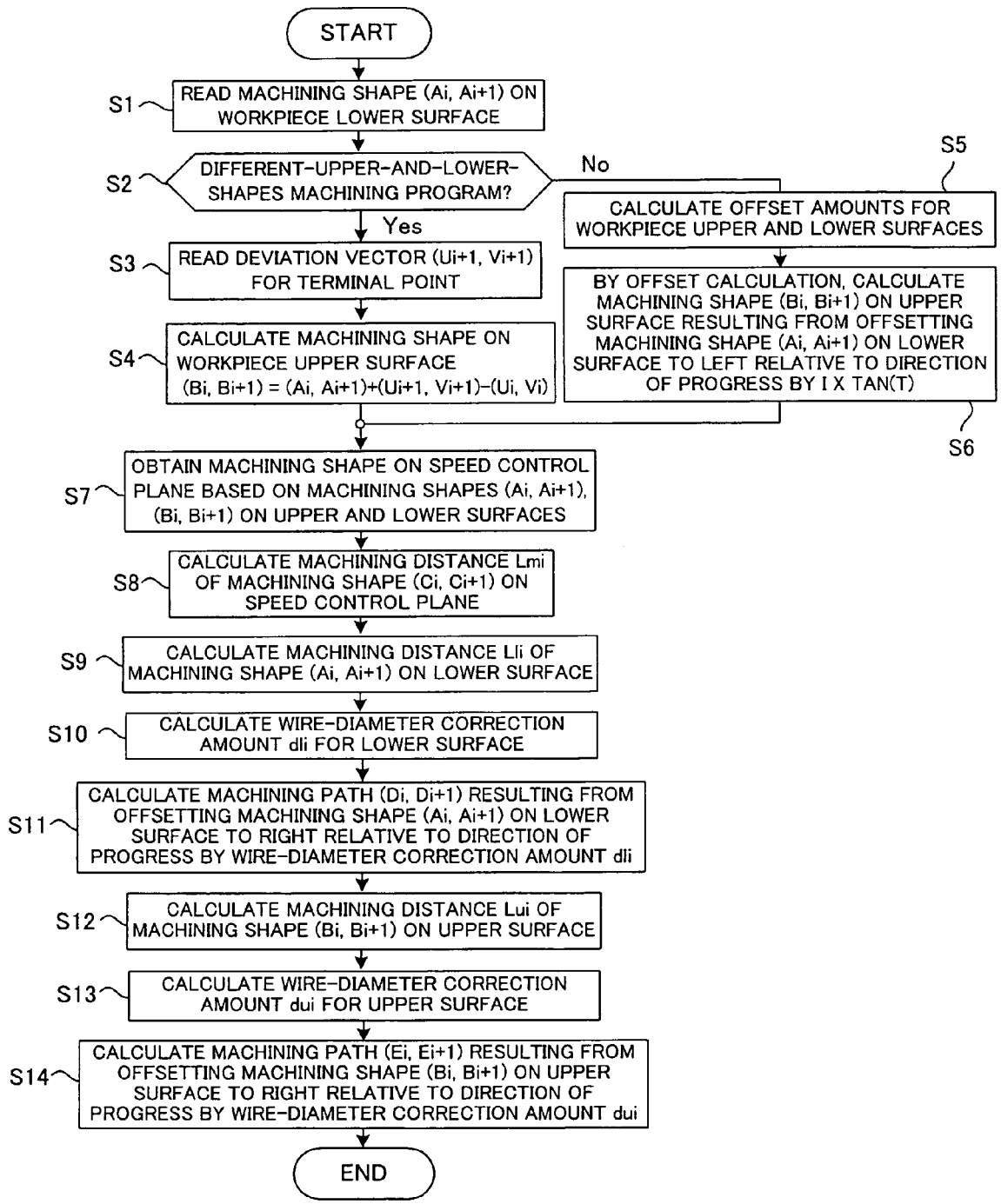
FIG. 17 is a flow chart showing a procedure for obtaining offset paths, performed for each block of a machining program.

From the above, it is concluded that the numerical controller (see FIG. 4) is only required to perform a procedure shown by the flow chart of FIG. 17, generate commands for the respective axes (X axis/Y axis, U axis/V axis) as mentioned above, on the basis of this procedure and feed the generated commands to the servo control sections for the X axis/Y axis and the U axis/V axis. The key points of the procedure shown by the flow chart of FIG. 17 have been already explained referring to FIG. 15, etc. Here, the points of respective steps of the procedure performed when ith block (i=1, 2, . . . ) of the machining program is read will be summarized below.

Step S1: Read a shape (Ai, Ai+1) for the workpiece lower surface.

Step S2: If it is a different-upper-and-lower-shapes machining program, go to Step S3. If not, go to Step S5.

Step S3: Read a deviation vector (Ui+1, Vi+1) for a terminal point of a machining path corresponding to the current block.

Step S4: Calculate a shape on the workpiece upper surface (Bi, Bi+1)=(Ai, Ai+1)+(Ui+1, Ui+1)−(Ui, Ui).

Step S5: Calculate an offset amount for the workpiece upper and lower surfaces.

Step S6: By offset calculation, calculate a machining shape (Bi, Bi+1) on the workpiece upper surface resulting from offsetting the shape (Ai, Ai+1) on the workpiece lower surface to the left relative to the direction of machining progress by an amount I×TAN(T).

Step S7: Obtain a machining shape (Ci, Ci+1) on the speed control plane based on the machining shapes (Ai, Ai+1), (Bi, Bi+1) on the workpiece upper and lower surfaces.

Step S8: Calculate a machining distance Lmi of the machining shape (Ci, Ci+1) on the speed control plane.

Step S9: Calculate a machining distance Lli for the machining shape (Ai, Ai+1) on the workpiece lower surface.

Step S10: Calculate a wire correction amount dli for the workpiece lower surface.

Step S11: Calculate a machining path (Di, Di+1) resulting from offsetting the machining shape (Ai, Ai+1) on the workpiece lower surface to the right relative to the direction of machining progress by the wire correction amount dli.

Step S12: Calculate a machining distance Lui for the machining shape (Bi, Bi+1) on the workpiece upper surface.

Step S13: Calculate a wire correction amount dui for the workpiece upper surface.

Step S14: Calculate a machining path (Ei, Ei+1) resulting from offsetting the machining shape (Bi, Bi+1) on the workpiece upper surface to the right relative to the direction of machining progress by the wire correction amount dui.

What is claimed is:

1. A wire electric discharge machine having a taper machining function for machining a workpiece between a first plane and a second plane such that a machining shape on the first plane and a machining shape on the second plane are not congruent according to a machining program, comprising:
    first means for obtaining a first machining path on the first plane and a second machining path on the second plane based on each of command blocks of the machining program;
    second means for calculating lengths of the first machining path and the second machining path;
    third means for adjusting a reference wire-diameter correction amount based on the lengths of the first and second machining paths to obtain adjusted wire-diameter correction amounts for the first and second machining paths, respectively;
    fourth means for correcting the first machining path and the second machining path according to the adjusted wire-diameter correction amounts to obtain corrected first and second machining paths; and
    fifth means for performing a taper machining by driving upper and lower wire guides relative to the workpiece according to the corrected first and second machining paths.

2. A wire electric discharge machine according to claim 1, wherein said third means obtains the adjusted wire-diameter correction amount for the first machining path as a sum of the reference wire-diameter correction amount and a product of a reference adjustment amount and a first value obtained by a mathematical operation using the length of the first machining path and a length of a machining path on a speed control plane designated for speed control, and obtains the adjusted wire-diameter correction amount for the second plane as a sum of the reference wire-diameter correction amount and a product of the reference adjustment amount and a second value obtained by a mathematical operation using the length of the second machining path and the length of the machining path on the speed control plane.

3. A wire electric discharge machine according to claim 2, wherein the first value is obtained by dividing the length of the first machining path by the length of the machining path on the speed control plane and subtracting the resultant quotient from one, and the second value is obtained by dividing the length of the second machining path by the length of the machining path on the speed control plane and subtracting the resultant quotient from one.

* * * * *